US006869533B2

United States Patent
Norgaard

(10) Patent No.: US 6,869,533 B2
(45) Date of Patent: Mar. 22, 2005

(54) HEATING SYSTEM AND METHOD FOR PREVENTION OF SEPTIC SYSTEM FREEZE-UP

(76) Inventor: Christopher T. Norgaard, 12141 Gates Ave., Northfield, MN (US) 55057

( * ) Notice: Subject to any disclaimer, the term of this patent is extended or adjusted under 35 U.S.C. 154(b) by 50 days.

(21) Appl. No.: 10/644,340

(22) Filed: Aug. 20, 2003

(65) Prior Publication Data

US 2005/0040114 A1 Feb. 24, 2005

(51) Int. Cl.[7] .................................................. C02F 3/00
(52) U.S. Cl. ....................... 210/612; 210/747; 210/170; 210/181; 210/187; 210/532.2
(58) Field of Search ................................. 210/605, 612, 210/620, 747, 170, 181, 187, 532.2

(56) References Cited

U.S. PATENT DOCUMENTS

| | | | | |
|---|---|---|---|---|
| 1,950,841 A | * | 3/1934 | Crawford | 210/170 |
| 2,938,630 A | * | 5/1960 | Novak | 210/532.2 |
| 3,196,105 A | * | 7/1965 | Schneider | 210/612 |
| 3,698,194 A | * | 10/1972 | Flynn | 210/532.2 |
| 3,758,748 A | | 9/1973 | Reid | |
| 3,907,679 A | * | 9/1975 | Yost | 210/532.2 |
| 4,139,321 A | | 2/1979 | Werner | |
| 4,257,239 A | | 3/1981 | Partin et al. | |
| 4,333,831 A | * | 6/1982 | Petzinger | 210/170 |
| 5,171,434 A | * | 12/1992 | Anderson et al. | 210/181 |
| 5,441,632 A | | 8/1995 | Charon | |
| 5,596,836 A | | 1/1997 | Benson | |
| 6,482,322 B1 | | 11/2002 | Tsigonis | |

* cited by examiner

Primary Examiner—Christopher Upton
(74) Attorney, Agent, or Firm—Moore, Hansen & Sumner, PLLP

(57) ABSTRACT

Disclosed is a septic heater system and method for preventing a freeze-up in a septic system. The heater system typically is used with a previously-installed septic system that includes a septic tank, drop boxes, connecting sewer pipe, a drainfield, and one or more vertical access/cleanout pipes which rise from one or more portions of the septic system to corresponding access ports at ground level. The heater system, which is adapted for connection to the access ports of one or more of the vertical access cleanout pipes, comprises a heater and fan system defining an output port for providing a flow of heated air at the heater output port. The heater output port is defined by a structure configured for coupling the output port to one or more of the access/cleanout pipes. The heater and fan system, when activated to provide the flow of heated air and when coupled to an access/cleanout pipe, prevents septic-system freeze-up by delivering the heated air down the access/cleanout pipe to the septic system.

19 Claims, 2 Drawing Sheets

→ Waste water
← Air flow

HEATING SYSTEM AND METHOD FOR PREVENTION OF SEPTIC SYSTEM FREEZE-UP

BACKGROUND OF THE INVENTION

The present invention relates to preventing-freeze-up in septic systems. In particular, the present invention is a system and method of directing warm air down through a septic system in order to prevent the septic system from freezing up in cold-weather locations.

The applicant has been aware of prior-art attempts to solve septic system freeze-up. Such attempts included a thawing method typically delivered by a specialized vendor. The thawing method utilizes a hot water heater and pumps which are used to pump hot water down into the septic system through clean-out access pipes, which typically are capped vertical pipes each of which go up to above-ground level from a portion of the septic system, such as up from the septic tank, drop boxes, or connecting sewer pipe.

Upon searching other prior art solutions, the applicant found an attempt to solve septic system freeze-up by forming over the septic system at ground level an insulating ground cover with hay, leaves, or similar material. Still another attempt used electric "thermo" tape extended down through the system, e.g., down through the clean-out access pipe to the drainfield drop box (which connects into the sewer pipe running from the septic tank), and "snaking" the heater tape through the sewer pipe, into the first drop box.

In addition, the applicant is aware of the following patents related to heating devices for cold-climate freeze-up prevention:

U.S. Pat. No. 3,758,748—Reid —SYSTEM FOR REMOVING SNOW AND ICE FROM PAVED SURFACES
U.S. Pat. No. 4,139,321—Werner—ROCK CHANNEL HEAT STORAGE
U.S. Pat. No. 4,257,239—Partin et al.—EARTH COIL HEATING AND COOLING SYSTEM
U.S. Pat. No. 5,441,632—Charon —SEPTIC SYSTEM WITH ABOVE-GROUND SEPTIC TANK
U.S. Pat. No. 5,596,836—Benson—UNDERGROUND SYSTEM FOR TREATING SOIL
U.S. Pat. No. 6,482,322—Tsigonis—APPARATUS AND METHOD FOR TREATING SEWAGE IN COLD CLIMATES Of the patents listed above, U.S. Pat. Nos. 5,441,632 (the '632 patent) and 6,482,322 (the '332 patent) are directed to septic systems.

The '632 patent discloses a septic system having an above-ground septic tank which is installed in a house for which it is to be used, or within an enclosure attached to the house. The septic system includes an electric heater and thermostatic switch for preventing the septic tank from freezing. Note that the septic system of the '632 patent does not connect to an underground septic system.

The '322 patent discloses a method and apparatus for treating sewage in cold climates including a pretreatment stage, an aerobic treatment stage, and a discharge stage, where cold outside air is combined with warm re-circulating air from within the sewage treatment system to provide oxygen for the aerobic treatment of the sewage. A blower draws in the air from the fresh air intake and the one or more re-circulating air intakes, and blows this air out an outlet. The treated sewage is discharged intermittently in high volume, high flow-rate batches to prevent freezing. As with the system of the '632 patent, note that the system of the '322 patent does not connect to an underground septic system.

Previously attempted solutions to septic system freeze-up are-difficult, messy, marginally successful, and/or relatively complex. There is no known simple, reliable system for preventing freeze-up in septic systems. The present invention provides the simple solution.

BRIEF SUMMARY OF THE INVENTION

The present invention is a septic heater system and method for preventing freeze-up in a septic system. The invention typically is used with a previously-installed septic system that-includes a septic tank, drop boxes, connecting sewer pipe, a drainfield, and one or more vertical access/cleanout pipes which rise from one or more portions of the septic system to access ports at or above ground level. The present heater system, which, is adapted for connection to the vertical access clean-out pipes, comprises a heater and fan system defining an output port for providing a flow of heated air at the heater output port. The heater output port is defined by a structure configured for coupling the output port to an access/cleanout pipe. The heater and fan system, when activated to provide the flow of heated air and when coupled to an access/cleanout pipe, prevents septic-system freeze-up by delivering the heated air down the access/cleanout pipe to the septic system.

Figure 1:
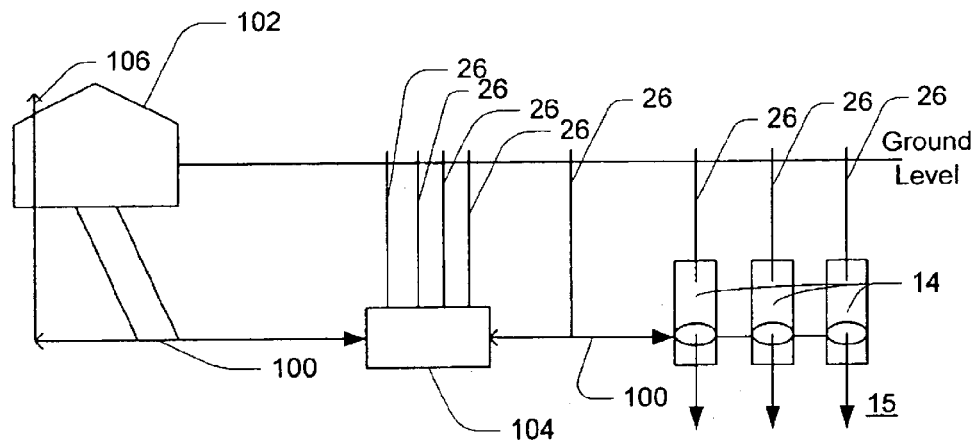
FIG. 1 is a schematic profile view of a typical gravity septic system.
Figure 2:
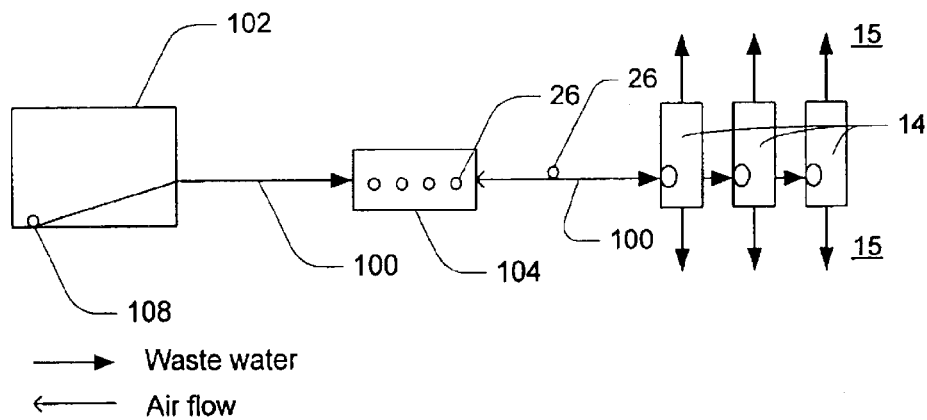
FIG. 2 is a schematic plan-view of a typical gravity septic system.
Figure 3:
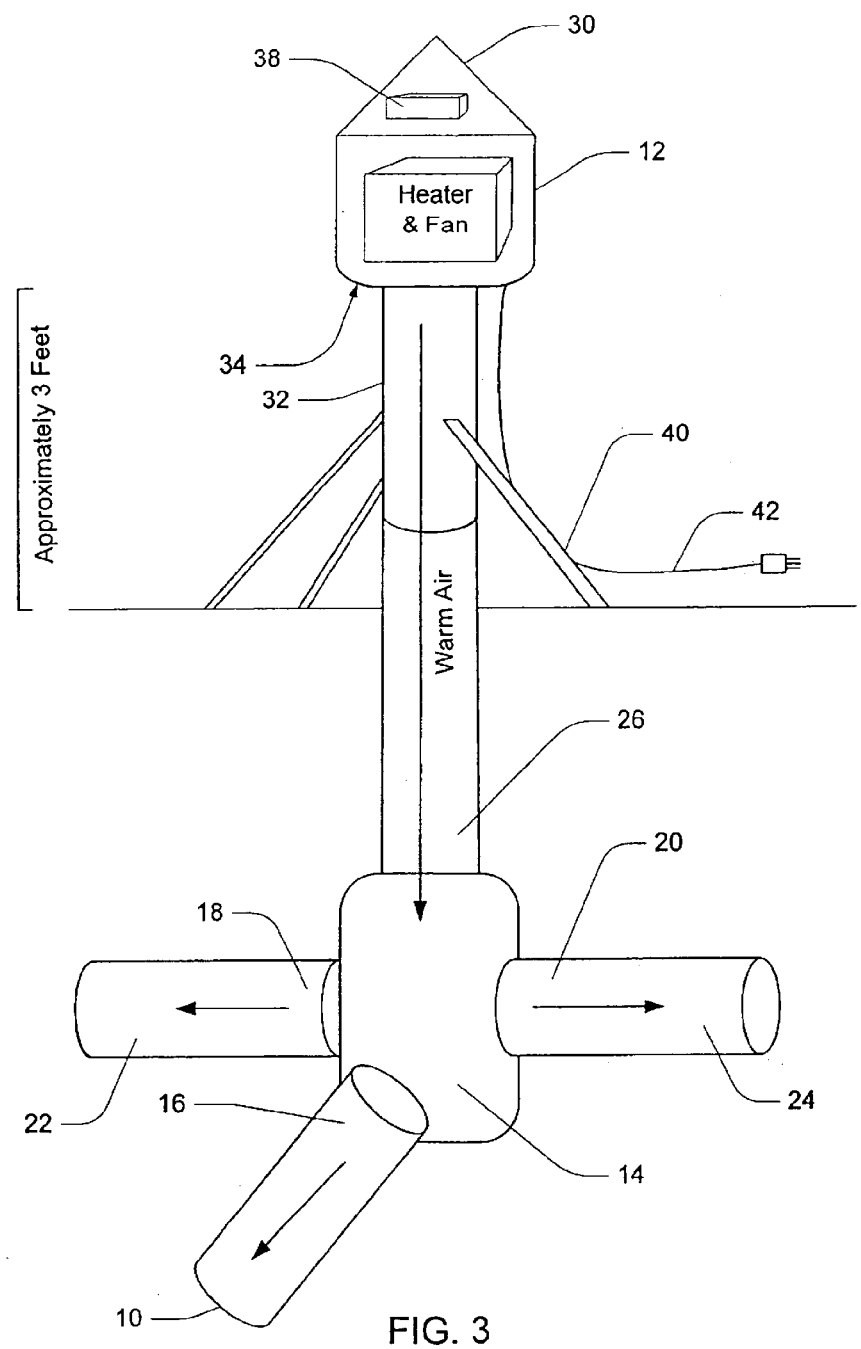
FIG. 3 shows a schematic of one embodiment of the disclosed septic heater system.

It is to be noted that FIGS. 1–3 are not to scale.

DESCRIPTION OF THE PREFERRED EMBODIMENTS

The present invention has been developed to overcome the problem of septic-system freeze-up in the winter. For the purposes of the present application, although specific portions of septic systems are sometimes referred, to, a septic-system is defined to include a septic tank, drop boxes, connecting sewer pipe, a drainfield, and vertical access/cleanout pipes which rise from one or more portions of the septic system to access ports at or above ground level. Septic system freezing has been a particular problem during winters in Minnesota and other northern states. Problems are especially severe when there have been exceptionally low temperatures, concurrent with little snow to serve as insulating ground cover.

When a septic system freezes, the flow of effluent from the septic tank is obstructed, causing the septic system to back up and become inoperative.

As shown in schematic septic-system views of FIGS. 1 and 2, a sewer pipe 100 normally extends from a house 102 to a septic tank 104 and then oh via a sewer pipe 100 to a series of drop boxes 14 and a drainfield 15. At the house end of the sewer pipe 100, the sewer pipe is connected to a vent 106 which typically protrudes from the roof of the house, and to a soil stack vent 108.

The septic system includes access/cleanout pipes which typically run up to or above ground level from the septic system, such as from any one or more of the septic tank, the sewer pipe, and drop boxes.

As shown in FIG. 3, each drop box 14 typically is in the nature of a manifold having multiple pipe connections such as 16, 18 and 20. As shown, additional pipes 22 and 24 (typically PVC) extend out from each drop box 14 into the drainfield to convey the sewage effluent into the underground drainfield.

A conventional system often includes a number of four-inch schedule 40 PVC or other suitable access/cleanout pipes 26 that extend from the septic system up to or above the ground level with a service cap (not shown) on the access port. It is possible to have a number of drop box manifolds within the septic system. Multiple drop boxes 14 are typically connected to one another for further distribution of the effluent into the drainfield, and each drop box typically has, its own access/cleanout pipe rising from the drop box to an access port at an above ground location. Note that, as shown in FIGS. 1 and 2, access/cleanout pipes can also run upward to above ground level from septic tank 104 and sewer pipe 100.

In any case, the present invention as an apparatus or method typically envisions connecting hot air to one or more of the access/cleanout pipes in order to prevents septic-system freeze-up by delivering the heated air down the access/cleanout pipes to the septic system.

One embodiment of the present system is shown in FIG. 1. The embodiment shown is an apparatus connectable to the top of a vertical access/cleanout pipe 26 (at the location where the service cap on the corresponding access port would normally be located). The apparatus is adaptable for directing warm or hot air down into the septic system through one or more of the access/cleanout pipes 26. Access/cleanout pipes 26 each may be a 4-inch sewer pipe. For this purpose, a "heater fan" or blower assembly 28 comprising a blower (not shown) and electric heater coil or other form of heat (not shown) is mounted in a weatherproof housing 12 having a removable cover 30.

An insulated output port-or coupling pipe 32 made of PVC or other suitable material is connected between the bottom or air intake 34 of the housing 12 and a vertical access/cleanout pipe 26 which extends down to the septic system One or more portions of housing 12, such as for example the bottom 34 of housing 12, is adapted to provide an air intake 34 which permits air to flow into the heater fan or blower assembly 28.

The overall assembly of the weatherproof housing, removable roof and output port may be stabilized when positioned over an access/cleanout pipe 26 by using adjustable or other poles or supports 40 running diagonally between the ground and the assembly, such as from the ground to the output port or coupling pipe 32.

Output port or coupling pipe 32 may be on the order of two feet to five feet in height in order to position the heater fan housing a suitable distance above ground level so that leaves, snow and other debris will not be sucked into the blower or fan.

A thermostatic control unit 38 is shown mounted under the removable cover 30 in the housing. Control unit 38 is set to activate the heater fan at a predetermined, low outdoor-temperature that could otherwise cause the septic system to undergo freeze-up.

Warm air directed by the heater fan or blower system 28 down through one or more-access/cleanout pipes 26 is directed-down into the septic system. Such a structure and method keep the septic system warm to avoid freeze-up.

Note that the present system and method may be employed by any simple method or any simple apparatus for blowing heated air down into the access/cleanout pipes protruding up from one or more portions of the septic system. Accordingly, the claims of the present application are not to be limited to any particular embodiment or method, but rather only by the limitations of the claims.

What is claimed is:

1. A septic heater system for preventing a septic system from freeze-up wherein the septic system includes a septic tank, drop boxes, connecting sewer pipe, a drainfield, and one or more vertical access/cleanout pipes which rise from one or more portions of the septic system to access ports at or above ground level, the heater system being adapted for connection to one or more of the vertical access/cleanout pipes, the heater system comprising:

a heater and fan system defining an output port for providing a flow of heated air at the heater output port;

the heater output port being defined by a structure configured for coupling the output port to the access/cleanout pipe; and wherein the heater and fan system, when activated to provide the flow of heated air and when the heated-air output port is coupled to one or more of the access/cleanout pipes, prevents septic-system freeze-up by delivering the heated air down the access/cleanout pipe to the septic system.

2. The septic heater system of claim 1 wherein the output port structure is configured for coupling the heated-air output port substantially at a top end of the access/cleanout pipe via an access port.

3. The septic heater system of claim 1 wherein the output port structure comprises a pipe configured for coupling the heated-air output port to the access/cleanout pipe.

4. The septic heater system of claim 1 wherein the heater system comprises a weatherproof housing which covers the heater and fan system and which has a removable cover for accessing the heater and fan system as well as related wiring and controls.

5. The septic heater system of claim 4 wherein the related wiring and controls include a thermostat for turning the heater and fan system on and off at appropriate temperatures for maintaining the septic system in an unfrozen state.

6. The septic heater system of claim 4 wherein a structural member of the weatherproof housing defines an air intake opening to enable air to enter the housing and flow through the heater and fan system and down the access/cleanout pipe to the septic system.

7. The septic heater system of claim 6 wherein the air intake opening defined by the structure is located in a position to help prevent debris from being sucked into the weatherproof housing.

8. The septic heater system of claim 6 wherein:

the weatherproof housing defines an air intake opening to enable air to enter the housing such that, when the housing is coupled to the access/cleanout pipe, the air entering the housing will flow through the heater and fan system and down the access/cleanout pipe to the septic system;

the structural member of the weatherproof housing which defines the air intake opening comprises a structural member located at the bottom of the housing; and the heated air output port of the housing is located at the bottom of the housing.

9. The septic heater system of claim 4 wherein the heater system comprises an insulated connector pipe to couple the heated-air output port of the housing to the access/cleanout pipe.

10. The septic heater system of claim 1 wherein the heater and fan system comprises an electrically-powered heater and fan having a power connection for coupling the heater and fan system to an electric power source.

11. The septic system of claim 1 wherein the system is assembled, operational, and coupled to the access/cleanout pipe.

12. A septic heater system for preventing a septic system from freeze-up wherein the septic system includes a septic tank, drop boxes, connecting sewer pipe, a drainfield, and one or more vertical access/cleanout pipes which rise from one or more portions of the septic system to access ports at or above ground level, the heater system being adapted for connection to one or more of the vertical access/cleanout pipes, the system comprising:

a weatherproof housing;

a heater-fan unit comprising a blower and heater, the heater-fan unit being mountable in the housing;

a thermostat configured for electrical coupling to the heater-fan unit for turning the heater and fan on and off at appropriate temperatures for maintaining the septic system in an unfrozen state; and the housing defining a heated-air output port mountable to the vertical access/cleanout pipe;

wherein the system, when assembled and coupled to the access/cleanout pipe, and when activated to provide the flow of heated air into the access/cleanout pipe, prevents septic-system freeze-up by delivering the heated air down the access/cleanout pipe to the septic system.

13. The septic heater system of claim 12 wherein the components of the heater system are sold as a kit to be assembled by the installer.

14. The septic heater system of claim 12 wherein the system is sold substantially assembled and substantially ready for installation on the access/cleanout pipe.

15. The septic heater system of claim 12 herein the weatherproof housing defines an opening which can be opened by a user for accessing and servicing the components of the system.

16. The septic heater system of claim 15 wherein the opening is defined by the weatherproof housing to be a removable roof.

17. The septic heater system of claim 12 wherein the heater and fan system comprises an electric heater and an electrically-powered fan having a power connection for coupling the heater and fan system to an electric power source.

18. The septic heater system of claim 12 wherein:

the weatherproof housing defines an air intake opening to enable air to enter the housing such that, when the housing is coupled to the access/cleanout pipe, the air entering the housing will flow through the heater and fan system down the access/cleanout pipe down to the septic system;

the structural member of the weatherproof housing which defines the air intake opening comprises a structure located at the bottom of the housing;

the heated air output port of the housing is located at the bottom of the housing; and the system comprises an insulated connector pipe to couple the heated-air output port of the housing to the access/cleanout pipe.

19. A method for preventing a septic system freeze-up wherein the septic system includes a septic tank, drop boxes, connecting sewer pipe, a drainfield, and one or more vertical access/cleanout pipes which rise from one or more portions of the septic system to access ports at or above ground level, the heater system being adapted for connection to one or more of the vertical access/cleanout pipes, the method comprising blowing a flow of heated air into one or more of the vertical access/cleanout pipes, wherein the flow of heated air flows down the one or more access/cleanout pipes and prevents septic-system freeze-up by delivering the heated air to septic system.

* * * * *

UNITED STATES PATENT AND TRADEMARK OFFICE
CERTIFICATE OF CORRECTION

PATENT NO. : 6,869,533 B2
DATED : March 22, 2005
INVENTOR(S) : Christopher T. Norgaard It is certified that error appears in the above-identified patent and that said Letters Patent is hereby corrected as shown below:

Column 5,
Line 34, delete "herein" and insert -- wherein --.

Signed and Sealed this

Eleventh Day of October, 2005

JON W. DUDAS
*Director of the United States Patent and Trademark Office*